United States Patent Office 3,269,961
Patented August 30, 1966

3,269,961
POLYURETHANE FOAM PREPARED FROM A HALOGEN CONTAINING POLYETHER
Herman A. Bruson, North Haven, and James S. Rose, Mount Carmel, Conn., assignors to Olin Mathieson Chemical Corporation, a corporation of Virginia
No Drawing. Original application July 13, 1961, Ser. No. 123,616. Divided and this application Oct. 30, 1962, Ser. No. 240,190
6 Claims. (Cl. 260—2.5)

The present invention relates to adducts of halogen-containing epoxides and monomeric polyhydric alcohols, process for the preparation of said adducts and rigid, flexible and semi-rigid polyurethane foams prepared from said adducts.

The present application is a division of co-pending application, Serial No. 123,616, filed July 13, 1961, by Herman A. Bruson and James S. Rose.

The rigid polyurethane foams have found wide and varied use in industry. For instance, they may be used as core materials between skins of many and varied compositions. In aircraft construction the foam may be enclosed between aluminum or fiber glass reinforced polyurethane skins to form an assembly which is rigid, strong and yet remarkably light. Because of their excellent electrical properties polyurethane foams enclosed by fiber glass reinforced polyurethane skins have also found use in the construction of radomes. The polyurethane foams have another useful property, they develop a high degree of adhesion during the foaming process. As a result they will adhere to skins composed of such varied materials as metals, polyurethanes, ceramics, glass, etc. The resulting sandwich-type assemblies lend themselves well for use in such diverse fields as in the construction and insulation industries.

Flexible and semi-rigid polyurethane foams have also found wide and varied use in industry, for example, the flexible foams may be used in furniture for cushioning, in packaging, in mattresses, in automobile seats and sun visors, etc., and semi-rigid foams may be used in automobile crash pads and packaging, etc.

Heretofore, numerous attempts have been made to impart flame retardance to polyurethane foams in view of the numerous applications where a flame retardant polyurethane foam is desirable. A typical method for imparting flame retardance to polyurethane foams includes the use of flame retardant additives, such as antimony trioxide. Although these processes achieve a certain degree of flame retardance, the additives employed are not chemically combined in the foam, but are are merely present in mechanical admixture; therefore, permanent and uniform flame retardance cannot be obtained. In addition, the flame retardant additives are progressively lost during the process, thus increasing the cost, and also frequently degrading desirable properties of the foam. An additional problem presented in flexible polyurethane foams is that the foam will melt when it burns and the melt is also flammable, thus providing a dangerous running fire.

It is, therefore, an object of the present invention to provide a rigid, flexible or semi-rigid polyurethane foam with built-in flame retardance.

It is a further object of the present invention to provide an intermediate for the preparation of polyurethane foams, which intermediate is characterized by having a high, built-in halogen content, and which intermediate is further characterized by having a wide range of utility.

It is a further object of the present invention to provide a novel process for the preparation of said halogen-containing intermediate.

Additional objects and advantages of the present invention will appear hereinafter.

In accordance with the present invention it has been found that the foregoing objects may be obtained. The novel halogen-containing adducts of the present invention are the adducts of a halogen-containing epoxide having the structural formula

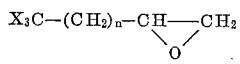

wherein X is selected from the group consisting of chlorine, fluorine, bromine and mixtures thereof and $n$ is an integer from 0–5 inclusive and a monomeric polyhydric alcohol. These adducts may be prepared by reacting together at an elevated temperature at least one mole of the foregoing halogen-containing epoxide and one mole of a monomeric polyhydric alcohol in the presence of a catalytic amount of a Lewis acid. The adducts of the present invention are polymeric in nature and contain varying amounts of units of the halogen-containing epoxide depending upon the reactants chosen and proportions thereof.

The adducts of the present invention may be then used to prepare flame retardant polyurethane foams by known methods.

The adducts of the present invention are characterized by a wide range of utility. They may be used to prepare rigid, flexible or semi-rigid polyurethane foams having built-in flame retardance. In addition, they may be used in the preparation of epoxy resins and in the preparation of polyesters, both being characterized by a high halogen content. Furthermore, they may be used in the preparation of high temperature lubricants.

It is surprising and unexpected to find in accordance with the present invention that the adducts of the present invention may be prepared in the presence of a Lewis acid catalyst. In the normal reaction of ethylene oxide or propylene oxide with polyols a basic catalyst is employed; however, when a basic catalyst is employed in the reaction between the halogen-containing epoxide employed in the present invention and a monomeric polyhydric alcohol no product results. Furthermore, it is surprising and unexpected to find that in accordance with the present invention analytically pure products are obtained without purification, i.e., no distillation or crystallization is required. The reaction mixture is merely neutralized and the product extracted. Still further, it is surprising and unexpected to find that the adducts of the present invention are prepared so readily, notwithstanding the bulk of the trihalomethyl group. This bulky group would be expected to sterically hinder the reaction.

The halogen-containing epoxides employed in the present invention are 1,2-epoxides and have the following structural formula:

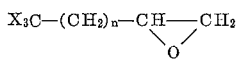

wherein X is selected from the group consisting of chlorine, fluorine, bromine and mixtures thereof and $n$ is an integer from 0–5 inclusive. When $n=0$ the halogen-containing epoxides employed in the present invention have the following structural formula:

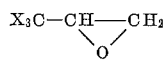

The halogen-containing epoxides are straight-chained, aliphatic epoxides. Any compound falling within the foregoing structural formula may be conveniently employed. The preferred epoxide in accordance with the present invention is 4,4,4-trichlorobutylene oxide; others include, for example, trichloropropylene oxide, 5,5,5-trichloropentylene oxide, 6,6,6-trichlorohexylene oxide, etc.

In the parparation of the adducts of the present invention any monomeric polyhydric alcohol may be employed. The polyhydric alcohol contains at least two hydroxyl groups, and may be aliphatic or aromatic, saturated or unsaturated. The preferred polyols which are employed are ethylene glycol and glycerol due to availability and ease of reaction. Others which may be employed include, but are not limited to, the following: propylene glycol, 1,4-butanediol, diethyleneglycol, dipropylene glycol, neopentyl glycol, triethylene glycol, hexamethylene glycol, hexanetriol, butanetriol, trimethylol propane, trimethylol ethane, polyglycerol, pentaerythritol, dipentaerythritol, polypentanerythritol, erythritol, mannitol, sorbitol, 2-butene-1,4-diol, 2-butyne-1,4-diol, p,p'-isopropylidenediphenol, resorcinol, catechol, hydroquinone, alkyl glucosides, such as methyl glucoside, 4,4'-dihydroxybenzophenone, etc.

In the process of the present invention at least one mole of the epoxy compound is employed per mole of polyhydric alcohol. The temperature of the reaction will naturally vary depending upon the reactants employed and amounts thereof, the catalyst and amount thereof and the reaction time. Generally, however, the reaction is conducted in the temperature range of between about 30 and 200° C. The reaction time will also vary depending upon the temperature of the reaction, the reactants and ratio thereof and the catalyst and amount thereof. Generally, however, a reaction time in the range of between about ½ to 8 hours is employed.

Optionally, in order to facilitate the reaction a non-reactive, organic solvent may be employed.

The reaction is conducted in the presence of a catalytic amount of a Lewis acid catalyst. Generally the Lewis acid is employed in an amount from about 0.5 to 40 percent by weight of the polyhydric alcohol. Any Lewis acid may be employed, for example, boron trifluoride, boron trifluoride etherate, boron trichloride, aluminum chloride, titanium tetrachloride, tin tetrachloride, ferric chloride, acidic clays, such as Tonsil clay.

The adducts of the present invention are especially useful in the preparation of polyurethane foams containing a high, built-in halogen content. They may be used in the preparation of rigid, semi-rigid, or flexible polyurethane foams. When the adducts of the present invention are employed in the preparation of rigid polyurethane foams, the molar ratio of halogen-containing epoxide to polyhydric alcohol should be such that the resultant adduct has a hydroxyl number between about 300–800. In the flexible polyurethane foams the hydroxyl number of the adduct should be between about 100 and 300. In the flexible polyurethane foams the hydrovyl number should be between about 30 and 100. The number of moles of halogen-containing epoxide per mole of polyhydric alcohol required in order to achieve the foregoing hydroxyl numbers will naturally vary depending upon the particular polyhydric alcohol employed and the hydroxyl content of polyhydric alcohol, for example, when the polyhydric alcohol employed is glycerol from about 1–3 moles of epoxide per mole of glycerol will give an adduct with a hydroxyl number in the range of about 300–600.

Any organic polyisocyanate may be employed in the preparation of the polyurethane foams. This includes diisocyanates, triisocyanates, and polyisocyanates. Naturally the organic diisocyanates are preferred due to commercial availability, especially mixtures of isomers of tolylene diisocyanate which are readily available commercially. Typical exemplificative isocyanates include, but are not limited to, the following: methylene-bis-(4-phenyl isocyanate), 3,3'-bitolylene-4,4'-diisocyanate, 3,3'-dimethoxy-4,4'-biphenylene diisocyanate, naphthalene-1,5-diisocyanate, hexamethylene diisocyanate, 1,4-phenylene diisocyanate, etc. The amount of isocyanate employed in the preparation of the polyurethane foams should be sufficient to provide at least 0.7 NCO groups based on the number of hydroxyl groups present in the reaction system. This would include the number of hydroxyl groups present in the adduct of the present invention, the number of hydroxyl groups in any additive employed and the number of hydroxyl groups employed in the blowing agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1 1,2-trichloro-1,2,2-trifluoroethane, methylene chloride, chloroform, and carbon tetrachloride. The amount of blowing agent employed may be varied within a wide range. Generally, however, the halogenated hydrocarbons are employed in an amount from 1 to 50 parts by weight per 100 parts by weight of the adduct of the present invention, and generally the water is employed in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine, trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight based on the adduct of the present invention.

Various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of adduct.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The present invention will be more readily apparent from a consideration of the following illustrative examples.

*Example I*

A 250 cc. three-neck flask was fitted with a stirrer, thermometer, reflux condenser, addition funnel, an a nitrogen inlet tube. To the flask was added 6.2 g. (0.10 mole) of ethylene glycol and while under a blanket of nitrogen and stirring, 3.0 g. of boron trifluoride etherate was added. This mixture formed a thick brown oil which became warm. The nitrogen flow was stopped and all openings were protected by calcium chloride tubes. The funnel was charged with 94.0 g. (0.536 mole) of 1,1,1-trichloro-3,4-epoxy butane (commonly called 4,4,4-trichlorobutylene oxide). The flask was cooled to 4° C. by an ice bath and the dropwise addition of the oxide begun during rapid stirring. The temperature was allowed to rise to approximately 30° C. whereupon an exotherm began which was controlled by the ice bath and the temperature not allowed to exceed 80° C. After twenty-eight minutes the addition was complete. The resulting thick, pale-brown syrup was heated on a steam bath for one and one-half hours at 70 to 72° C. It was then dissolved in 100 cc. of benzene and washed with 100 cc. of dilute sodium carbonate solution. The lower organic layer was washed with three successive 100 cc. portions of fresh water. Solvent was removed using a flash evaporator under aspirator pressure followed by oil pump pressure (0.05 mm.). The residue was a pale yellow syrup having a molecular weight of 1000; weight—89.5 g. (90% yield).

*Analysis.*—Calcd. for product: C, 28.05%; H, 3.29%; Cl, 56.90%; Hydroxyl No. 112. Found: C, 28.31%; H, 3.25%; Cl, 56.09%; Hydroxyl No. 107.

*Example II*

A 500 cc. three-neck flask was equipped as in Example I. While under a blanket of nitrogen, a mixture consisting of 46.0 g. (0.5 mole) of glycerol and 13.0 g. of boron trifluoride etherate was added to the flask. The flask was cooled to 10° C. by an ice bath and over a period of one hour and twenty minutes 164.4 g. (0.935 mole) of 4,4,4-trichlorobutylene oxide was added. The exotherm temperature reached a maximum of 135° C., but for the major part of the addition the ice bath kept the temperature well below this maximum. The reaction mixture was heated on a steam bath for one and one-half hours at 70 to 80° C. and was then dissolved in 300 cc. of benzene. The benzene solution was washed with 150 cc. of sodium carbonate solution and the bottom organic layer was washed with four 200 cc. portions of fresh water. Solvent was removed by means of a flash evaporator leaving a residue of pale yellow syrup having a molecular weight of 637.5; weight—112.5 g. (59% yield).

*Analysis.*—Calcd. for product: C, 29.05%; H, 3.73%; Cl, 51.8%; Hydroxyl No. 264. Found: C, 29.24%; H, 3.87%; Cl, 50.59%; Hydroxyl No. 264. Acid No. 0.029 mg. KOH/g.; percent $H_2O$, 0.10%.

*Example III*

In a manner after Example I, 3,3,3-trichloropropylene oxide, 3,3,3-tribromopropylene oxide or 3,3,3-trifluoropropylene oxide is reacted in the presence of boron trifluoride etherate with ethylene glycol to yield adducts which are colorless to pale yellow liquids having molecular weights of 400 to 3000. The resulting adducts are suitable for reacting with tolylene diisocyanate to give flame-retardant polyurethane foams.

The following is a comparative example showing that no reaction occurs in the presence of a basic catalyst.

*Example IV*

Potassium hydroxide (85% pure), 0.456 gram, was dissolved in ethylene glycol, 15.5 grams (0.25 mole), and the mixture heated to 68° C. 4,4,4-trichlorobutylene oxide, 234.5 grams (1.34 moles), was then slowly added dropwise to the mixture. The pH of the mixture decreased as the 4,4,4-trichlorobutylene oxide was added. Additional potassium hydroxide was added until an equivalent was consumed. The theoretical amount of potassium chloride was recovered. Distillation of the liquid product and infra red analysis indicated the following product distribution:

| | Percent |
|---|---|
| Olefin formation | 48 |
| Oxide recovery | 4 |
| Hydroxyl compound (impure ethylene glycol) | 15 |
| Intractable residue | 33 |

Thus basic catalysis causes predominant dehydrochlorination of the oxide.

The following examples show the use of the adducts of the present invention in the preparation of flame retardant polyurethane foams.

*Example V*

The product of Example I, 100 grams, was placed in a 400 ml. beaker and 1 gram of stannous octoate and 4 grams of water were added. The mixture was stirred until homogenous and 57 grams of a mixture of tolylene diisocyanate isomers (about 80% 2,4-tolylene diisocyanate and 20% 2,6-tolylene diisocyanate) was then added. The mixture was stirred for about 20 seconds, at the end of which time a slight exotherm began to form and the mixture became creamy. The mixture was poured into an 8" x 8" x 4" form and allowed to rise and cure at room temperature for a period of about 1 minute. The resulting polyurethane foam had a density of 3 pounds per cubic foot and was self-extinguishing upon ignition with a Bunsen flame.

*Example VI*

The product of Example II, 100 grams, was heated to about 35° C. in a 400 ml. beaker. Stannous octoate, 0.4 gram, and methylene chloride, 20 grams, was then added. The mixture was stirred until homogeneous and 44 grams of a mixture of tolylene diisocyanate isomers (about 80% 2,4-tolylene diisocyanate and 20% 2,6-tolylene diisocyanate) was then added. The mixture was stirred for about 20 seconds at the end of which time a slight exotherm began to form and the mixture became creamy. The mixture was then poured into an 8" x 8" x 4" form and allowed to rise and cure for a period of about one minute. The resulting foam had a density of 3 pounds per cubic foot and was self-extinguishing upon ignition with a Bunsen flame.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. A polyurethane foam prepared by the process which comprises reacting together
   (1) a halogen-containing adduct obtained by the process which comprises reacting
      (a) at least one mole of a halogen-containing epoxide having the structural formula

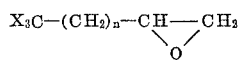

wherein X is selected from the group consisting of chlorine, fluorine, bromine, and mixtures thereof and $n$ is an integer from 0 to 5, per mole of
      (b) a compound selected from the group consisting of ethylene glycol, glycerol, propylene glycol, 1,4-butanediol, diethylene glycol, dipropylene glycol, hexanetriol, butanetriol, trimethylol propane, trimethylol ethane, pentaerythritol, dipentaerythritol, erythritol, mannitol, sorbitol, 2-butene-1,4-diol, 2-butyne-1,4-diol, p,p'-isopropylidenediphenol, resorcinol, catechol, hydroquinone, alkyl glucosides, and 4,4'-dihydroxybenzophenone,
      (c) in the presence of a catalytic amount of a Lewis acid catalyst
   (2) an organic polyisocyanate in an amount of at least 0.7 NCO groups based on the number of hydroxyl groups present,
   (3) a foaming agent and
   (4) a reaction catalyst.
2. A polyurethane foam prepared by the process which comprises reacting together
   (1) a chlorine-containing adduct obtained by the process which comprises reacting (a) at least one mole of 4,4,4-trichlorobutylene oxide per mole of
(b) ethylene glycol
(c) in the presence of a catalytic amount of a Lewis acid catalyst
(2) an organic polyisocyanate in an amount of at least 0.7 NCO groups based on the number of hydroxyl groups present,
(3) a foaming agent and
(4) a reaction catalyst.

3. A polyurethane foam prepared by the process which comprises reacting together
(1) a chlorine-containing adduct obtained by the process which comprises reacting
(a) at least one mole of 4,4,4-trichlorobutylene oxide per mole of
(b) glycerol
(c) in the presence of a catalytic amount of a Lewis acid catalyst
(2) an organic polyisocyanate in an amount of at least 0.7 NCO groups based on the number of hydroxyl groups present,
(3) a foaming agent and
(4) a reaction catalyst.

4. In the process for preparing a urethane foam by reacting a polyether polyol and an organic polyisocyanate in the presence of a foaming agent and a reaction catalyst, the improvement which comprises employing as said polyether polyol the reaction product of an organic polyhydric compound and a halogen-containing epoxide having the structural formula

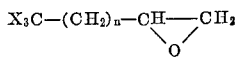

wherein X is selected from the group consisting of chlorine, fluorine, bromine and mixtures thereof and $n$ is an integer from 0 to 5 inclusive, said reaction product being prepared by the process which comprises reacting together
(1) a halogen-containing adduct obtained by the process which comprises reacting
(a) at least one mole of said halogen-containing epoxide
(b) a compound selected from the group consisting of ethylene glycol, glycerol, propylene glycol, 1,4-butanediol, diethylene glycol, dipropylene glycol, hexanetriol, butanetriol, trimethylol propane, trimethylol ethane, pentaerythritol, dipentaerythritol, erythritol, mannitol, sorbitol, 2-butene-1,4-diol, 2-butyne-1,4-diol, p,p' - isopropylidenediphenol, resorcinol, catechol, hydroquinone, alkyl glucosides, and 4,4'-dihydroxybenzophenone,
(c) in the presence of a catalytic amount of a Lewis acid catalyst.

5. In the process for preparing a urethane foam by reacting a polyether polyol and an organic polyisocyanate in the presence of foaming agent and a reaction catalyst, the improvement which comprises employing as said polyether polyol the reaction product obtained by reacting at least one mole of 4,4,4-trichlorobutylene oxide per mole of ethylene glycol in the presence of a catalytic amount of a Lewis acid catalyst.

6. In the process for preparing a urethane foam by reacting a polyether polyol and an organic polyisocyanate in the presence of a foaming agent and a reaction catalyst, the improvement which comprises employing as said polyether polyol the reaction product obtained by reacting at least one mole of 4,4,4-trichlorobutylene oxide per mole of glycerol in the presence of a catalytic amount of a Lewis acid catalyst.

References Cited by the Examiner

UNITED STATES PATENTS 3,033,803   5/1962   Price et al. _____ 260—2
3,139,410   6/1964   Wild et al. _____ 260—2.5

FOREIGN PATENTS 528,136   7/1956   Canada.

OTHER REFERENCES

Smith et al.: Ind. and Eng. Chem. vol. 49, No. 8, August 1957, pages 1241–1246.

LEON J. BERCOVITZ, *Primary Examiner.*

D. E. CZAJA, *Assistant Examiner.*